United States Patent
Wei et al.

(10) Patent No.: US 9,418,423 B2
(45) Date of Patent: Aug. 16, 2016

(54) MOTION CORRECTION AND NORMALIZATION OF FEATURES IN OPTICAL COHERENCE TOMOGRAPHY

(75) Inventors: Jay Wei, Fremont, CA (US); Ben Jang, Cupertino, CA (US)

(73) Assignee: OPTOVUE, INC., Fremont, CA (US)

( * ) Notice: Subject to any disclaimer, the term of this patent is extended or adjusted under 35 U.S.C. 154(b) by 347 days.

(21) Appl. No.: 13/569,892

(22) Filed: Aug. 8, 2012

(65) Prior Publication Data

US 2013/0039557 A1    Feb. 14, 2013

Related U.S. Application Data

(60) Provisional application No. 61/521,718, filed on Aug. 9, 2011.

(51) Int. Cl.
 *G06K 9/00* (2006.01)
 *G06T 7/00* (2006.01)
 *G06K 9/62* (2006.01)

(52) U.S. Cl.
 CPC .......... *G06T 7/0016* (2013.01); *G06K 9/00214* (2013.01); *G06K 9/6201* (2013.01); *G06T 2207/10101* (2013.01); *G06T 2207/20201* (2013.01); *G06T 2207/30041* (2013.01)

(58) Field of Classification Search
 None
 See application file for complete search history.

(56) References Cited

U.S. PATENT DOCUMENTS

| | | | |
|---|---|---|---|
| 6,485,413 B1 | 11/2002 | Boppart et al. | |
| 7,477,763 B2* | 1/2009 | Willis et al. | 382/128 |
| 7,764,828 B2* | 7/2010 | Sasaki | G06K 9/00281 345/473 |
| 7,982,879 B2* | 7/2011 | Desjardins et al. | 356/477 |
| 8,174,702 B2* | 5/2012 | Tearney et al. | 356/479 |
| 8,768,049 B2* | 7/2014 | Wang | G06K 9/00885 382/115 |
| 8,781,214 B2* | 7/2014 | Davis et al. | 382/154 |
| 8,823,954 B2* | 9/2014 | Xu | 356/625 |
| 9,092,691 B1* | 7/2015 | Beaumont | G06T 7/0014 |
| 2010/0157309 A1 | 6/2010 | Tearney et al. | |
| 2011/0170111 A1 | 7/2011 | Rolland et al. | |
| 2012/0150029 A1* | 6/2012 | Debuc | A61B 3/102 600/425 |

FOREIGN PATENT DOCUMENTS

WO    WO 2007/084748 A2    7/2007

OTHER PUBLICATIONS

Gabriele et al. ( Optical coherence tomography: History, current status, and laboratory work):2425-2435; Apr. 2011.*
M. Kraus et al., "Motion Artifact Correction in OCT Volume Scans Using Image Registration", ARVO, 4405/A238, 2010.

(Continued)

*Primary Examiner* — Nancy Bitar
(74) *Attorney, Agent, or Firm* — Haynes & Boone, LLP (57) ABSTRACT

An optical coherence tomography system is provided. The system includes an OCT imager; a two-dimensional transverse scanner coupled to the OCT imager, the two-dimensional transverse scanner receiving light from the light source and coupling reflected light from a sample into the OCT imager; a computer coupled to receive 3D OCT data from the OCT imager, the computer further processes the 3D OCT data; wherein the processing the 3D OCT data includes: correcting motion artifacts in baseline mode; generating reference data in baseline mode; performing segmentation to identify volumes of interest; extracting feature information, the feature information including reflectivity, texture, or the combination thereof.

16 Claims, 6 Drawing Sheets

(56) References Cited

OTHER PUBLICATIONS

K.W. Gossage et al., "Texture analysis of optical coherence tomography images: feasibility for tissue classification", J. Biomed Opt, vol. 8, No. 3, pp. 570-575, 2003.

Y. Xu et al., "MDCT-Based 3-D Texture Classification of Emphysema and Early Smoking Related Lung Pathologies", IEEE Trans. Medical Imaging, vol. 25, No. 4, pp. 464-475, 2006.

P. Maragos, "Pattern Spectrum and Multiscale Shape Representation", IEEE Trans. Pattern Analysis and Machine Intelligence, vol. 11, No. 7, pp. 701-716, 1989.

International Preliminary Report on Patentability and Written Opinion mailed Feb. 20, 2014, in related International Application No. PCT/US2012/050017.

PCT International Search Report and the Written Opinion mailed Nov. 2, 2012, in related International Application No. PCT/US2012/050017.

Mujat et al., "Retinal nerve fiber layer thickness map determined from optical coherence tomography images", in Optics Express, vol. 13, Issue 23, pp. 9480-9491, Aug. 22, 2005.

Nukada et al., "Detection of Localized Retinal Nerve Fiber Layer Defects in Glaucoma Using Enhanced Spectral—Domain Optical Coherence Tomography", In Ophthalmology, vol. 118, Issue 6, pp. 1038-1048, Jun. 2011.

Supplementary Partial European Search Report mailed Apr. 16, 2015, in related European Application No. 12822422.7.

M.L. Gabriele et al., "Optical Coherence Tomography: History, Current Status, and Laboratory Work", Investigative Ophthalmology & Visual Science, vol. 52, No. 5, pp. 2425-2436, Apr. 14, 2011.

J. Chen et al., "A Partial Intensity Invariant Feature Descriptor for Multimodal Retinal Image Registration", IEEE Transactions on Biomedical Engineering, IEEE Service Center, vol. 57, No. 7, pp. 1707-1718, Jul. 1, 2010.

D. Cabrera, "A Review of Algorithms for Segmentation of Retinal Image Data Using Optical Coherence Tomography" In: "Image Segmentation", Apr. 19, 2011.

Y. Li et al., "Registration of OCT fundus images with color fundus photographs based on blood vessel ridges", Optics Express, pp. 96-101, Dec. 20, 2010.

\* cited by examiner

MOTION CORRECTION AND NORMALIZATION OF FEATURES IN OPTICAL COHERENCE TOMOGRAPHY

RELATED APPLICATIONS

This application claims priority to U.S. Provisional Application 61/521,718, filed on Aug. 9, 2011, which is herein incorporated by reference in its entirety.

BACKGROUND

1. Field of the Invention

The invention relates generally to the field of optical coherence tomography and applications thereof. Specifically, the invention relates generally to methods and systems for collecting and processing three-dimensional (3D) data or two-dimensional (2D) images in ophthalmology.

2. Description of Related Art

Optical Coherence Tomography (OCT) is an optical signal and processing technique that captures three-dimensional (3D) data sets with micrometer resolution. The OCT imaging modality has been commonly used for non-invasive imaging of an object of interest, such as cornea and retina of the human eye, over the past 15 years. A cross sectional retinal image from an OCT scan allows users and clinicians to evaluate various kinds of ocular pathologies in the field of ophthalmology. However, due to limitations of scan speed in imaging devices based on time-domain technology (TD-OCT), only a very limited number of cross-sectional images can be obtained for evaluation and examination of the entire retina.

In a new generation of OCT technology, Fourier-Domain or Spectral Domain Optical Coherence Tomography (FD/SD-OCT) has significantly improved over TD-OCT with, for example, better scan speeds and resolution. 3D data sets with dense raster scan or repeated cross-sectional scans can now be achieved by FD-OCT with a typical scan rate of approximately 17,000 to 40,000 A-scans per second.

These technological advances in OCT enable massive amounts of data to be generated at an ever increasing rate. As a result of these developments, myriad scan patterns were designed and employed to capture various volumes of interest (VOI) of the eye to enhance diagnostic capabilities.

Current trends in OCT ophthalmology make extensive use of 3D imaging and image processing techniques to obtain and process 3D data. The 3D data can be utilized for diagnosing diseases such as glaucoma, age-related macular degeneration (AMD), corneal diseases, and other medical conditions affecting the eye. Analyses of OCT data have been mostly focused on thickness measures of various segmented layers in the cornea and the retina. However, ocular diseases may affect the scattering properties of ocular tissues without changing the thickness measures. Some other physical characteristics and properties of the cellular layers of the eye can provide additional information useful for evaluations and diagnosis of different eye conditions.

Involuntary motions of the subject's eye during OCT data acquisition commonly create artifacts that can impact the accuracy and reliability of the physical characteristics and properties of the VOL. These motions introduce relative displacements of the acquired data; for example, physical features could appear discontinuous in the resulting 3D data and might deviate from the true anatomy of the eye, resulting in unreliable and inaccurate processing and evaluation.

It is common in the arts to perform diagnosis of ophthalmic diseases based on qualitative visual impressions and/or quantitative computer-aided diagnosis (CAD) analysis. Therefore, it is important to employ one or more processing methods to ensure the acquired 3D data and the extracted features remain consistent and readily comparable due to differences in system to system or modality to modality variations. There is a need for systems that improve the accuracy and effectiveness of the processing and evaluation of OCT data.

SUMMARY

In accordance with some embodiments, an optical coherence tomography (OCT) system is provided. An optical coherence tomography (OCT) system according to some embodiments includes an OCT imager; a two-dimensional transverse scanner coupled to the OCT imager, the two-dimensional transverse scanner receiving light from the light source and coupling reflected light from a sample into the OCT imager; and a computer coupled to receive 3D OCT data from the OCT imager, the computer further capable of executing instructions to process the 3D OCT data; the instructions including correcting motion artifacts in baseline mode, generating reference data in baseline mode, performing segmentation to identify volumes of interest, and extracting feature information, the feature information including reflectivity, texture, or the combination thereof.

In some embodiments, a method of data analysis for ophthalmology includes acquiring at least one 3D OCT data set; correcting motion artifacts in baseline mode; generating reference data in baseline mode; performing segmentation to identify volumes of interest; extracting feature information, the feature information including reflectivity, texture, or a combination thereof.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein.

DETAILED DESCRIPTION

Optical Coherence Tomography (OCT) technology has been commonly used in the medical industry to obtain information-rich content in three-dimensional (3D) data sets. For example, OCT technology can be used to provide imaging for catheter probes during surgery. In the dental industry, OCT has been used to guide dental procedures. In the field of ophthalmology, OCT is capable of generating precise and high resolution 3D data sets that can be used to detect and monitor different eye diseases in the cornea and the retina.

Different scan configurations have been developed for different industries and for different clinical applications. These scan configurations further expand the application of OCT technology in different clinical applications and further enhance the quality and information-richness of 3D data sets obtained by OCT technologies.

Some embodiments of the present invention are proposed to enhance data accuracy of OCT data. Such data can then be used to evaluate tissue structure of the eye and diagnose eye diseases. Specifically, some embodiments of the current disclosed analysis can be utilized in computer-aided diagnosis (CAD) methods and applied to the diagnoses of pathologies in the fovea (e.g. Diabetic Retinopathy), in the optic nerve head (e.g. Glaucoma), in the cornea (e.g. Keratoconus) and other regions of the eye and pathologies of interests.

Figure 1:
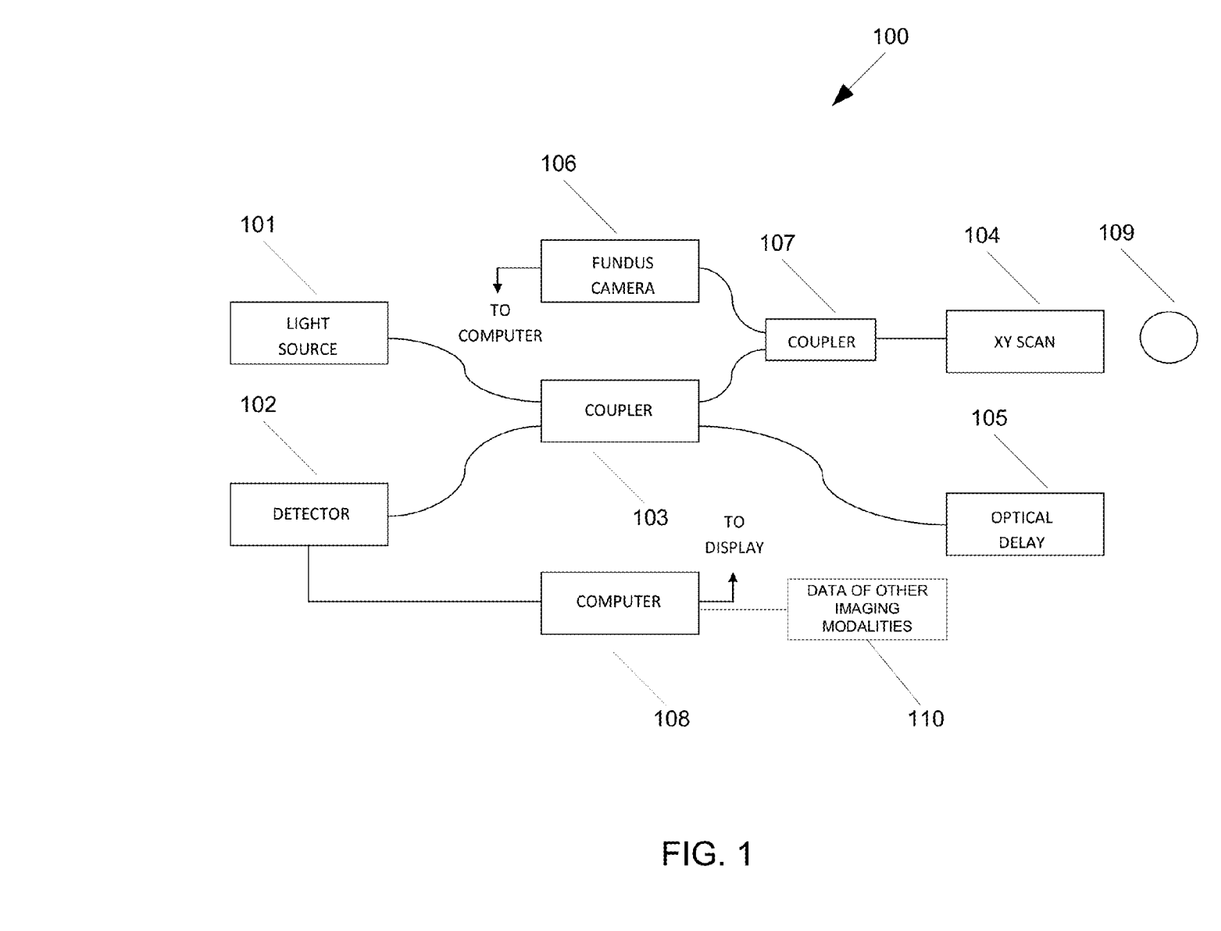
FIG. 1 is an example of an OCT system that can be used in some embodiments of the present invention.

FIG. 1 illustrates an example of an OCT system 100 that can be utilized in processing and analyzing an OCT data set according to some embodiments of the present invention. OCT system 100 includes light source 101 supplying light to coupler 103, which directs the light through the sampling arm to XY scan 104 and through the reference arm to optical delay 105. XY scan 104 scans the light across eye 109 and collects the reflected light from eye 109. Light reflected from eye 109 is captured in XY scan 104 and combined with light reflected from optical delay 105 in coupler 103 to generate an interference signal. The interference signal is coupled into detector 102. OCT imager 100 can be a time domain OCT system, in which case depth (or A-scans) are obtained by scanning optical delay 105, or a Fourier domain imager, in which case detector 102 is a spectrometer that captures the interference signal as a function of wavelength. In either case, the OCT A-scans are captured by computer 108. Collections of A-scans taken along an XY pattern are utilized in computer 108 to generate 3-D OCT data sets. Computer 108 can also be utilized to process the 3-D OCT data sets into 2-D images according to some embodiments of the present invention. Computer 108 can be any device capable of processing data and may include any number of processors or microcontrollers with associated data storage such as memory or fixed storage media and supporting circuitry.

In additional to the OCT system 100, an apparatus for computer-aided diagnosis of ocular pathologies according to the present invention may include a camera 106, which can be a fundus camera. Light from camera 106 can be coupled into the sample arm of OCT imager 100 by a coupler 107. Coupler 107 prevents light from camera 106 from entering coupler 103 while directing reflected light from eye 109 that originates from camera 106 back into camera 106. Data from resources of other imaging modalities 110 can also be imported to computer 108 by local or internet networking. Utilizing the combination of images, 3D OCT data, and resources imported from other imaging modalities, it is expected that more reliable CAD of ocular pathologies can be achieved.

Figure 3:
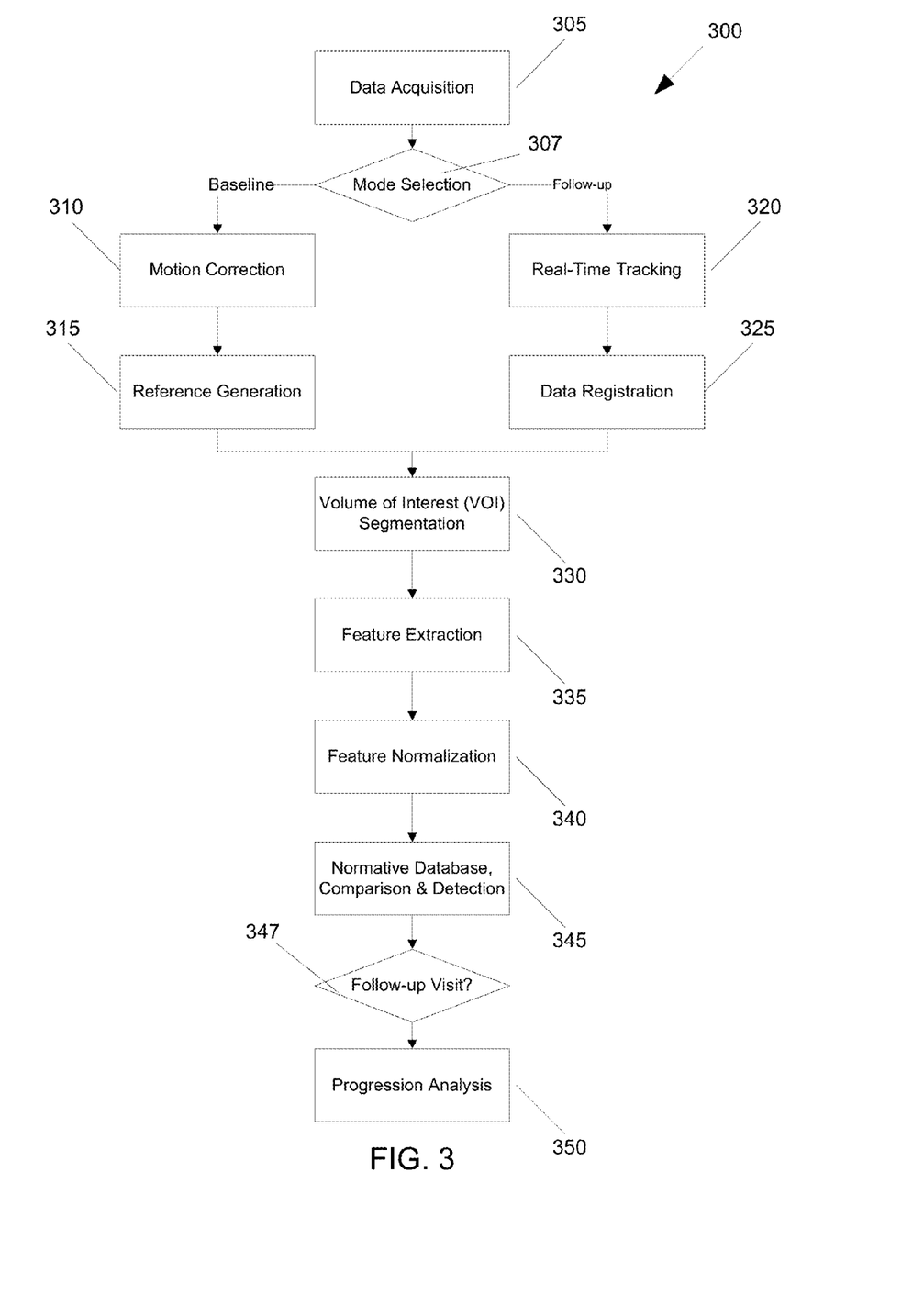
FIG. 3 shows a block diagram illustrating the steps of the computer-aided diagnosis (CAD) method according to some embodiments of the present invention.

FIG. 3 shows a block diagram illustrating the steps of the computer-aided diagnosis (CAD) method according to some embodiments of the present invention. According to FIG. 3, the first step is to perform OCT data acquisition 305. Depending on the determination of mode in mode selection 307, the data acquired in data acquisition 305 is utilized in a baseline or a follow-up mode. In the baseline mode, motion correction 310 for OCT data is performed. Reference generation 315 is then performed to form a baseline reference. In follow-up mode, real-time tracking step 320 can perform a tracking and data registration 325 can be performed. Under either the baseline mode or the follow-up mode, the next step is to segment volumes of interest (VOI) in step 330. Features of interest within the VOI can be extracted in step 335. Feature normalization is then performed in step 340. In some embodiments, a normative database (NDB) can then be constructed for feature comparison and detection in step 345. In addition, in the follow-up scan mode as determined in step 347, features from different points in time can be further analyzed and evaluated using progression analysis in step 350. Details of the embodiments in FIG. 3 are further described in the following descriptions.

Data Acquisition Step 305

Figure 4:
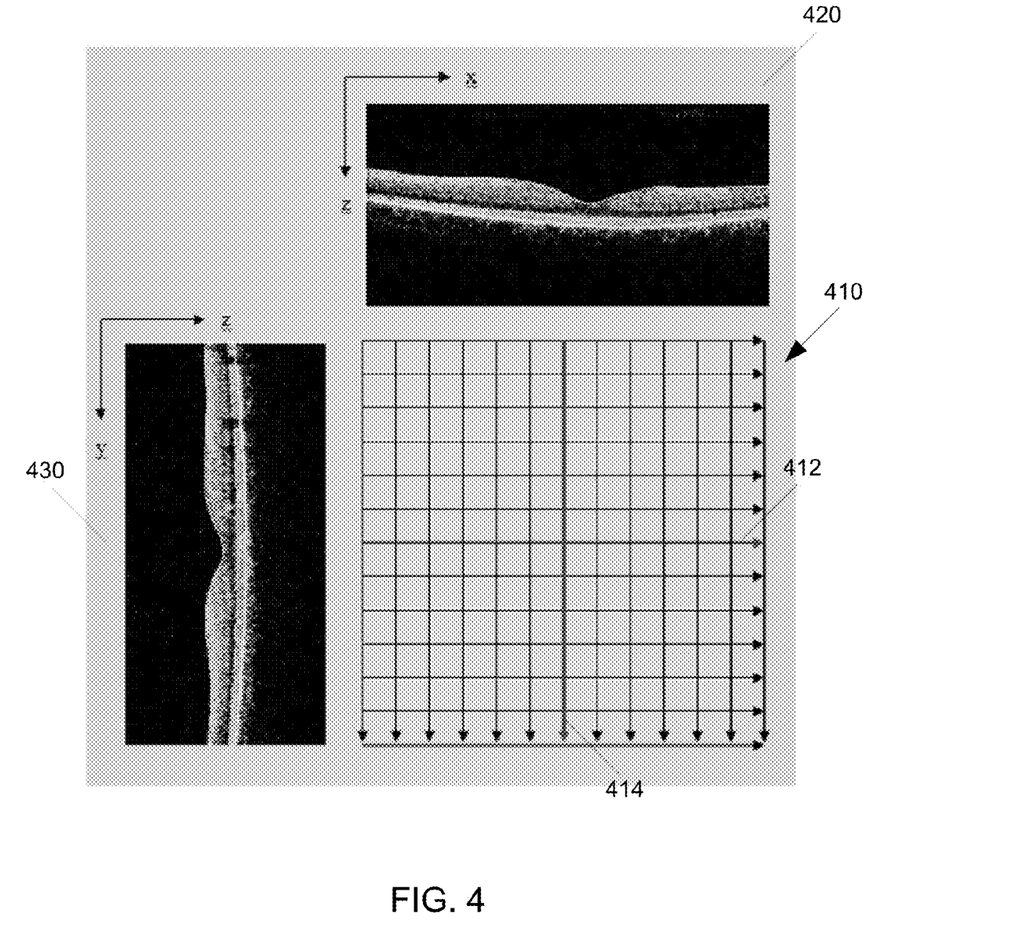
FIG. 4 shows an example baseline scan pattern in horizontal (x) and vertical (y) coordinates to acquire a sequence of 2D OCT images.

The first step in CAD method 300 illustrated in FIG. 3 is the acquisition of OCT data in data acquisition 305. In some embodiments, the OCT data can be acquired utilizing a scan pattern 410 as shown in FIG. 4. Other scan patterns commonly known in the arts can also be used to allow sufficient 3D information to be utilized, depending on the clinical application. The scan pattern should be capable of covering substantially the eye features of interest, for examples, the fovea or the optic nerve head. The 2D OCT image 420 in the x-z coordinates shown in FIG. 4 is acquired through the horizontal scan (x-scan) as indicated by the bold horizontal line 412 in scan pattern 410. Similarly, the 2D OCT image 430 in the z-y coordinates shown in FIG. 4 is acquired through the vertical scan (y-scan) as indicated by the bold vertical line 414.

According to some embodiments, both the horizontal and vertical scans illustrated in scan pattern 410 are applied, rather than applying either horizontal or vertical scans alone, to provide sufficient and reliable information for the 3D data alignment. Motion artifacts along the z-direction are more readily detected and corrected using information from both the horizontal and vertical scans.

Motion Correction Step 310 in Baseline Mode

Artifacts resulting from eye motion during a 3D volume scanning usually degrade data quality and directly impact the accuracy and reliability of subsequent quantitative measurements. Motion correction can be performed in motion correction step 310 and a ground truth or a pseudo-motionless data set, 3D data or 2D image, can be obtained to avoid the impact of motion artifacts to the measurements and data evaluations to be subsequently performed.

In some embodiments of the present invention, an iterative process using blood vessels pattern from other imaging modalities can be used to correct the motion within a 3D OCT data set in step 310. In some embodiments, fundus photography, for example from fundus camera 106, can be used to provide highly accurate spatial information of the retina that can be utilized to perform motion correction. A fundus photograph usually contains few motion artifacts. One or more offset vectors can be calculated using the spatial information obtained in motion correction 310 to adjust the 3D OCT data. Preferably, the x, y and z dimension of the data set can be adjusted. In some embodiments, higher dimensional spatial adjustment can also be achieved. In step 310, instead of using the fundus photography, in some embodiments a 2D simulated scanning laser ophthalmoscope (SSLO) image can be generated, which is similar to the fundus image, by manipulating all or partial tissue reflectivity of the scanned OCT data. The reflectivity values and morphological properties of the blood vessels can also be utilized to assess the quality of the motion correction with respect to each offset vector generated in step 310. A quantitative score can be defined, such as, for example, by evaluating the accuracy of landmark positions or reflectivity contrast. The optimal alignment can be achieved by finding the optimal offset vector for each of the OCT images such that the total score from the sequence of all OCT images yields the highest score among all possible offset vectors within specified search ranges.

In some embodiments, the motion correction method 310 can be based on two or more consecutive 3D-OCT volume scans with orthogonal fast scan axis directions. In this method, a complete scan pattern generates at least two 3D data sets where the first data set was acquired using only the horizontal (x) scans, and the second data set using only the vertical (y) scans, as shown in FIG. 4.

In other embodiments, high-performance computing techniques, such as the hardware-related Streaming SIMD (Single Instruction Multiple Data) Extension (SSE) and Graphic Processing Units (GPU) can be used to increase the speed performance of the motion correction step 310.

Reference Generation Step 315 in Baseline Mode

Since saving the scanned 3D data sets usually utilizes a large memory space, it is advantageous to extract a subset of the motion-corrected data to be the baseline reference. In step 315, the baseline reference data is important because it can be used as a baseline to facilitate data registration and progression analyses for OCT data sets acquired in follow up visits. The baseline reference can also be used for visualization applications. In some embodiments, the blood vessels can be extracted as a subset of the motion-corrected data and saved as the baseline reference for subsequent follow-up visits. The networking structure of the blood vessels significantly reduces the needed memory for storage and processing and further provides an information rich reference for the data registration in follow-up visits.

Real-time Tracking Step 320 in Follow-Up Mode

In order to track disease progression or its response to treatment, it is desirable to perform OCT measurements at substantially the same location over multiple office visits. In the follow-up mode of the data acquisition as in step 320, video-based or SLO-based real-time tracking can be used to compensate patient eye motion during the data acquisition of step 320, which; this method can also account for any changes in the patient's fixation location from one visit to another to further reduce motion artifacts. Step 320 allows OCT scans to be acquired at substantially identical locations over multiple office visits for the same subject, further improving the quality of the OCT data for subsequent processing and analyses.

Data Registration Step 325 in Follow-Up Mode

In step 325 of the follow-up data acquisition mode, a previously saved baseline reference in OCT can be used to register data from OCT or other imaging modalities acquired in the current or follow-up visits. In common clinical practice, patients are routinely examined by different ophthalmic instruments providing both structural and functional information. For example, the OCT data providing structural information can be registered with the color fundus photography (structural information) or the visual field test data (functional information) to provide physicians more useful diagnostic information. The landmarks (e.g. blood vessels and fovea location) can be used for the data registration step 325. Since the scan area, scan resolutions, and noise characteristics can vary from instrument to instrument, additional data processing can be performed before the data registration to enhance data quality; such data processing can be noise reduction, contrast enhancement, and any other methods commonly used in the arts for data enhancement. The data registration step 325 can be achieved by any data registration method. In some embodiments, data registration step 325 uses auto-correlation functions with the capabilities of detecting variants in multiple dimensions, including scaling, rotating, and translation.

Volume of Interest (VOI) Segmentation Step 330

Multiple-layer segmentation algorithms for the retinal, choroidal, and cornea scans are available in the RTVue FD-OCT systems (Optovue, Fremont, Calif.). 3D surfaces are hierarchically detected starting from the highest gradient magnitudes, and ending with the most subtle ones. In some embodiments, all surfaces are smoothed using some linear and nonlinear filters with a priori histological information. For retina related scans, the segmentation can generate the following retinal surfaces, namely inner limiting membrane (ILM), nerve fiber layer (NFL), ganglion cell layer (GCL), inner plexiform layer (IPL), inner nuclear layer (INL), outer plexiform layer (OPL), outer nuclear layer (ONL), outer limiting membrane (OLM), inner segment layer (ISL), connecting cilia (CL), outer segment layer (OSL), Verhoeff's membrane (VM), and retinal pigment epithelium (RPE). For choroidal related scans, the segmentation can generate surfaces such as Bruch's membrane (BM), choriocapillaries (CC), Sattler's layer (SL), Haller's layer (HL), and choroid sclera interface (CSI). For cornea related scans, the segmentation can generate anterior segment surface/tear film (TF), epithelium layer (EPL), Bowman's membrane (BOM), stroma layer (STL), Descemet's membrane (DM), and endothelium layer (ENL).

In step 330, once the desired surfaces are segmented or identified, the volume of interest (VOI) can be defined by the 3D space between any two of the segmented or identified surfaces of interest discussed above. For examples, in the early diagnosis of glaucoma, it is useful to define the VOI as the 3D space between ILM and RNFL or between ILM and IPL. For intraocular lens implantation, the space between TF and ENL can be used to compute the corneal power. For subjects with aged-related macular degeneration (AMD), the retinal layers from ILM to RPE are especially interested for the case of cystoid macular edema (CME), from ILM to ONL for the case of diabetic macular edema (DME), and from ISL to RPE for the cases of drusen disruption and geographic atrophy (GA).

In addition to the VOI defined in various depth (z) positions, it can be defined in various spatial (x,y) locations. For example, the standard ETDRS (Early Treatment Diabetic Retinopathy Study) sectors can be the VOI used to evaluate each feature locally centered at the retinal fovea pit in the (x,y) plane. Depending on the desired clinical application, a suitable VOI can be segmented from the reference data of the baseline visit or the registered data of the follow-up visits for further detection or analysis.

Feature Extraction Step 335

Figure 2A:
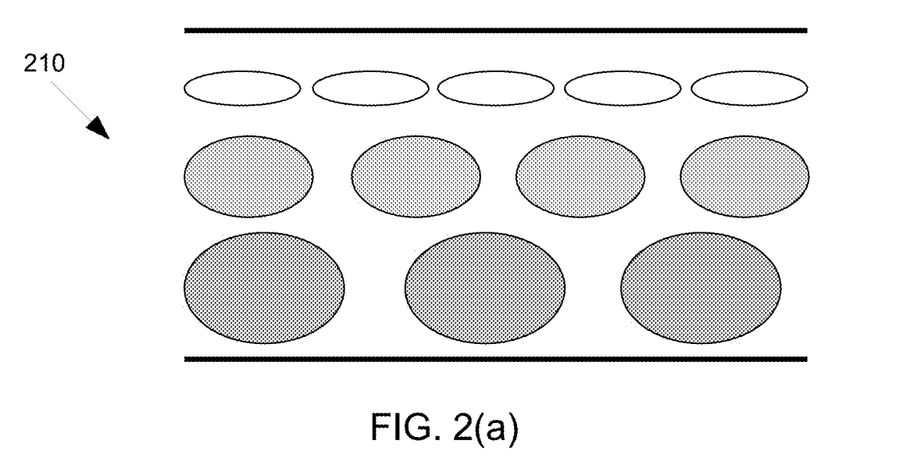
FIGS. 2a and 2b illustrate exemplary reflectivity and texture difference of a B-scan (x-z) image in (a) a normal case and (b) a pathology case.
Figure 2B:
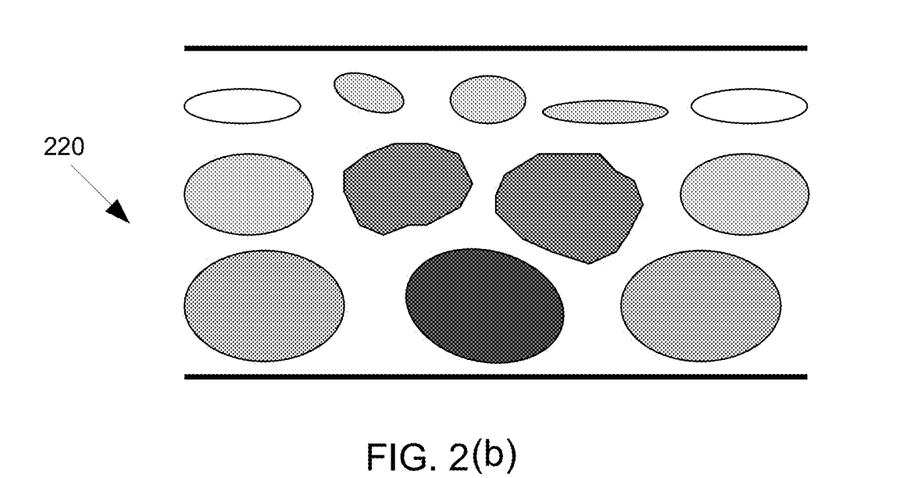

In step 335, once the layers are segmented as described in 330, different properties of the ocular tissues in each of these layers are extracted and analyzed. It has been common in the art to segment and analyze 3D data for layer thickness, however, in some embodiments of the present invention, analysis of other important properties and characteristics of the retina or VOI are provided. These important and yet frequently overlooked properties can be layer reflectivity and tissue texture. FIGS. 2a and 2b are diagrams showing different structural properties of the tissue layers without any thickness changes. FIG. 2a shows the cellular structure of the tissue layers in a healthy case, the cellular structure 210 is regularly spaced and cells are well organized and have similar shapes and sizes. FIG. 2b shows an example of changes in the cellular level; the shape, size and organization of the different tissue layers 220 change due to pathologies without any change in tissue thickness. These changes result in areas with reduced reflectivity and textural differences in the acquired data, in addition to shading produced by media opacities. Therefore, reflectivity and texture analysis methods can be more suitable for quantifying the spatial variations in these situations, where pathology changes the cellular structure and properties without any changes in tissue thickness.

3D reflectivity and texture features are computed in the VOI from step 330. Some important features, denoted by $F(x,y,z|VOI)$, include the intensity level distribution measures, run length measures, co-occurrence matrix measures, wavelet analysis measures, and pattern spectrum measures and other measures commonly known in the arts.

In some embodiments, a 2D feature map, which is an advanced feature derived from the above 3D features, can be generated by $$F\text{-Map}(x,y) = \Sigma_{z \text{ in } VOI} F(x,y,z|VOI),$$

where the 2D feature map can be a summation of the texture measures along the z-axis in VOI.

Depending on the specific application, a 1D feature spectrum can be represented by further extracting information from the above 3D features or a 2D feature map. For example, the number of retinal disruptions with a given shape B and dimension r in the VOI can be defined as:

$$F\text{-Spectrum}(r,B) = \# \text{ of the shape B with size } r \text{ in } VOI$$

In this example, a shape-size spectrum is used to quantitatively evaluate the shape and size in the segmented VOI. Large impulses in the feature spectrum at a certain size indicate the existence of major (protruding or intruding) substructures of the shape B at that given size. The bandwidth of the pattern spectrum, $m_{bw}$, can be used to characterize the size span of the shape B, and can be defined as:

$$m_{bw} = r_{max} - r_{min},$$

where the size parameters $r_{max}$ and $r_{min}$ denote the maximum size and minimum size in the feature spectrum, respectively.

In some embodiments, an entropy-like feature complexity measure based on the feature spectrum, $m_{ir}$, can further be used to characterize the shape and irregularity of the tissues in the VOI. Mathematically, it can be expressed by:

$$m_{ir} = -\Sigma p(r,B) \log [p(r,B)],$$

$$p(r,B) = F\text{-Spectrum}(r, B)/\text{Volume}(VOI).$$

In this example, $p(r,B)$ is the probability function by treating F-Spectrum (r, B) from a probabilistic viewpoint. The maximum value of $m_{ir}$ is attained whenever the feature spectrum is flat, indicating that the feature of interest is very irregular or complex by containing B (e.g. sphere) patterns of various sizes. It reaches its minimum value (0) whenever the feature spectrum contains just an impulse at, for instance, r=k; then VOI is simply a pattern B of size k and therefore can be considered to be the most regular (or the least irregular).

Figure 5A:
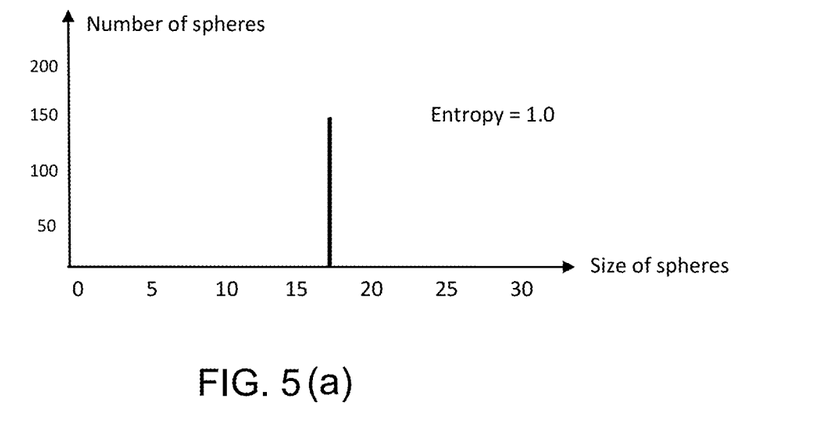
FIGS. 5a and 5b show examples of feature spectra for (a) a normal case and (b) a pathology case.
Figure 5B:
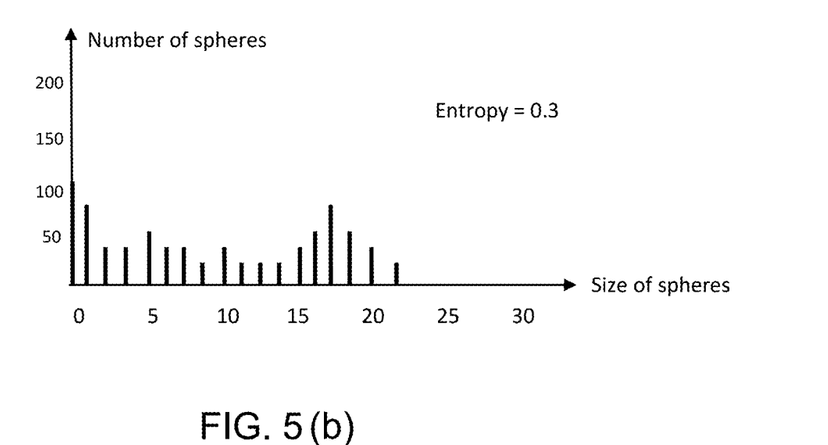

FIGS. 5a and 5b show an example of a feature spectra of the entropy measures from the exemplary tissue layer structure as described in FIG. 2. FIG. 5a demonstrates the entropy measure of the tissue structure of the healthy case as shown in FIG. 2a, while FIG. 5b shows the entropy measure of the irregular cellular structure of the pathology case as shown in FIG. 2b.

Feature Normalization Step 340

In common clinical practice, the diagnosis of ophthalmic disease is primarily based on visual impressions. Comparing the relative features (reflectivity and texture) quantitatively among different measurements can be more effective and reliable when the features are normalized against some predefined reference. In some embodiments of the present invention, the normalization performed in step 340 can be based on OCT data. The data reflectivity may be normalized based on the maximum reflectivity at a specific reference layer. For example, the RPE, CC, and TF can be used as the reference layers for the retina, choroid, and cornea scans, respectively. The normalized features can be expressed by:

$$NF(x,y,z|VOI) = F(x,y,z|VOI) \times K/\mu$$

where K and $\mu$ are the target average reflectivity value (reference value) and the measured average reflectivity value of the reference, respectively.

Alternatively, histogram-based analysis can be used to provide an estimate of the data reflectivity at a specific reference layer. This characteristic reflectivity estimate can be used to compensate the scan-to-scan variation in data reflectivity.

In some embodiments, the feature normalization step 340 can utilize other imaging modalities. There are a variety of imaging modalities commonly used by ophthalmologists to aid in the diagnoses of different disease conditions. In addition to OCT, some frequently used modalities include color fundus photography, fluorescein angiography (FA), indocyanine green (ICG) angiography, ultrasonography, scanning laser ophthalmoscopy (SLO) and its derivatives (tomography, polarimetry). Various imaging modalities provide data with different reflectivity and contrast for tissues of interest. For example, we may use feature contrast between the foveal area and the blood vessels in the fundus photography as the reference to normalize a 2D feature map for OCT data. That is, $$NF\text{-Map}(x,y) = F\text{-Map}(x,y) \times C/c$$

where C and c are the average contrast values in fundus photography (reference value) and in acquired OCT data, respectively.

In some embodiments, the normalization is based on OCT light sources of multiple-bands. In most OCT systems 100, light source 101 is a single band light source, typically centered around a wavelength of 830 nm. Alternatively, using a light source 101 of center wavelength 500 nm will yield different tissue reflectivity in the same VOI. For example, a healthy OCT RNFL data acquired with the 500 nm light source may exhibit about twice the reflectivity value as it would have been with the 830 nm light source. Damage to the RNFL may result in decreased reflectivity, which is usually more evident in the 500 nm light source than in the 830 nm light source. Therefore, features extracted from OCT data at a given wavelength can be normalized by those extracted in another wavelength. The reflectivity ratio can be estimated to be close to 2.0 for a healthy RNFL and close to 1.0 for a damaged RNFL.

Normative Database (NDB) Comparison and Abnormalities Detection Step 345

In step 345, normalized features from 340 can be compared to a normative database for disease detection and evaluation. The normative database of ocular data (data with normal appearance) can be derived from a set of N number of OCT volumes from normal eyes. In some embodiments, the distribution of each normalized feature at each 2D feature map location (x,y) across these N volumes is defined by the average $\mu_N(x,y)$ and the standard deviation $\sigma_N(x,y)$ of the N feature values (one normalized feature value per volume). Thus, the deviation $d(x,y|VOI)$ between a normalized feature map NF-Map(x,y) and the average can be expressed by:

$$d(x,y|VOI) = (NF\text{-Map}(x,y) - \mu_N(x,y))/\sigma_N(x,y).$$

A simple method to classify ocular abnormalities according to some embodiments consists of computing the local deviations from the normal appearance at set cutoff points, for example the following four cutoffs:

a. 99% cutoff: d(x, y|VOI)=2.32;
b. 95% cutoff: d(x, y|VOI)=1.64;
c. 5% cutoff: d(x, y|VOI)=−1.64;
d. 1% cutoff: d(x, y|VOI)=−2.32.

For example, in the CAD of glaucoma patients using the RNFL reflectivity as a feature, the tissue location can be classified as normal (≥5% cutoff), suspect (≥1% and <5% cutoff), and advanced glaucoma (<1% cutoff) using such exemplary scheme.

Progression/Analysis Step 350

Figure 6:
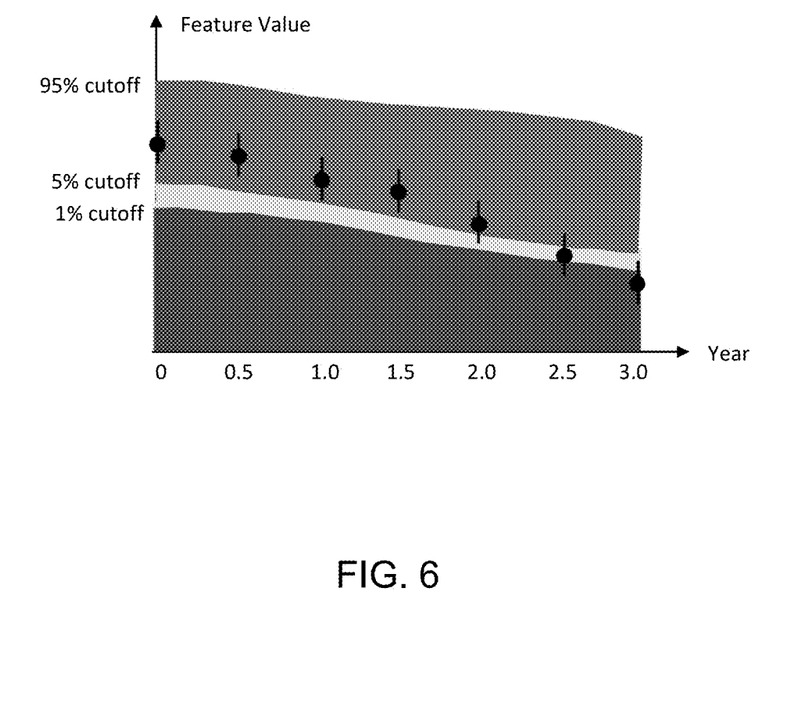
FIG. 6 shows an exemplary schematic diagram of a progression analysis with normative database displayed in various cutoff colors and confident intervals.

When data is acquired in the follow-up visit mode, a progression analysis can be performed in step 350 to monitor the trend and progress of a particular medical condition. In step 350, the reproducibility of each of the extracted features can be evaluated for both normal and pathology cases. Reproducibility of the features accounts for the variations of different contributing factors; common factors include systems, operators, and measurement repeatability. A common measure of the reproducibility can be represented by the standard deviation of the feature under evaluation. The smaller the standard deviation, the more reproducible the measurement and thus the more reliable the results of the progression analysis. An example of a progression analysis according to some embodiments of the present invention is shown in FIG. 6. In this example, a trend analysis is performed over a period of time, typically a period of 2 to 5 years in a common clinical setting. In this example, extracted feature of the acquired OCT data is plotted against time at about a 6-month interval for a period of 3 years. This trend analysis is also overlaid on a feature-adjusted normative database (eg. age-adjustment) as described in step 345. The progression analysis in FIG. 6 can also include vertical bars at each feature value, indicating the standard deviation of the feature under evaluation, to graphically demonstrate the confidence and repeatability of the results.

It should be understood that certain embodiments or portions thereof may be implemented in hardware, firmware, or software. If implemented in software, the software may be any language that can cause a processor to be configured in a manner to perform embodiments discussed herein or equivalents thereof. The software may be in the form of executable instructions and stored on any non-transient or transient, computer-readable medium that can be loaded and executed by a general purpose or application-specific processor.

While the methods and devices described herein have been particularly shown and described with references to example embodiments thereof, it will be understood by those skilled in the art that various changes in form and details may be made therein.

We claim:

1. A method of data analysis for ophthalmology, comprising:
   acquiring first 3D OCT data;
   correcting motion artifacts in the first 3D OCT data;
   extracting a networking structure of blood vessels from the first 3D OCT data;
   saving the networking structure of the blood vessels as reference data, the reference data using less storage space than would otherwise be used to store the first 3D OCT data;
   acquiring second 3D OCT data for processing in a follow-up mode, the second 3D OCT data being acquired at a different point in time from the first 3D OCT data and from a different imaging modality than the first 3D OCT data;
   registering the second 3D OCT data to the saved reference data;
   performing segmentation of the first or second 3D OCT data to identify volumes of interest;
   extracting feature information from the first or second 3D OCT data, the feature information including reflectivity, texture, or a combination thereof.

2. The method of claim 1, further comprising normalizing the feature information.

3. The method of claim 2, further comprising constructing a normative database and identifying abnormality in the first or second 3D OCT data.

4. The method of claim 1, further comprising performing progression analysis using the first and second 3D OCT data.

5. The method of claim 1, wherein the different imaging modality is chosen from a set that includes color fundus photography, visual field testing, scanning laser ophthalmoscope, fluorescein angiography, indocyanine green angiography, and ultrasonography.

6. The method of claim 1, wherein the volume of interest includes data substantially from a retinal region, a choroidal region, a corneal region, or a combination thereof.

7. The method of claim 6, wherein the volume of interest contains information from at least one spatial dimension.

8. The method of claim 1, further comprising calculating a quantitative parameter, the quantitative parameter being selected from a group comprising an intensity level distribution measure, a run length measure, a co-occurrence matrix measure, a wavelet analysis measure, a pattern spectrum measure, and a combination thereof.

9. The method of claim 1, wherein the feature information further includes a tissue shape-size spectrum, tissue entropy measure, tissue contrast or a combination thereof.

10. An optical coherence tomography (OCT) system, comprising:
    an OCT imager;
    a two-dimensional transverse scanner coupled to the OCT imager, the two-dimensional transverse scanner receiving light from the light source and coupling reflected light from a sample into the OCT imager; and
    a computer coupled to receive first and second 3D OCT data from the OCT imager, the second 3D OCT data having been acquired at a different point in time from the first 3D OCT data and from a different imaging modality than the first 3D OCT data, the computer further capable of executing instructions to process the first and second 3D OCT data, the instructions including:
    correcting motion artifacts in the first 3D OCT data;
    extracting a networking structure of blood vessels from the first 3D OCT data;
    saving the networking structure of the blood vessels as reference data, the reference data using less storage space than would otherwise be used to store the first 3D OCT data;
    registering the second 3D OCT data to the saved reference data;
    performing segmentation of the first or second 3D OCT data to identify volumes of interest; and
    extracting feature information from the first or second 3D OCT data, the feature information including reflectivity, texture, or a combination thereof.

11. The OCT system of claim 10, the instructions further comprising normalizing the feature information, constructing a normative database, and identifying abnormality in the first or second 3D OCT data.

12. The OCT system of claim 10, the instructions further comprising performing progression analysis with using the first and second 3D OCT data.

13. The OCT system of claim 10, wherein the different imaging modality is chosen from a set that includes color fundus photography, visual field testing, scanning laser ophthalmoscope, fluorescein angiography, indocyanine green angiography, and ultrasonography.

14. The OCT system of claim 10, wherein the volume of interest includes data substantially from a retinal region, a choroidal region, a corneal region, or a combination thereof; and contains information from at least one spatial dimension.

15. The OCT system of claim 10, the instructions further comprising calculating a quantitative parameter, the quantitative parameter being selected from a group comprising an intensity level distribution measure, a run length measure, a co-occurrence matrix measure, a wavelet analysis measure, a pattern spectrum measure, and a combination thereof.

16. The OCT system of claim 10, wherein the feature information further includes a tissue shape-size spectrum, tissue entropy measure, tissue contrast or a combination thereof.

* * * * *